United States Patent [19] [11] 4,064,899
Lehmann [45] Dec. 27, 1977

[54] CONTROL AND SIGNAL ARRANGEMENT FOR RESPIRATORS

[75] Inventor: Klaus Dieter Lehmann, Cologne-Deutz, Germany

[73] Assignee: Kurt Matter GmbH K.G., Germany

[21] Appl. No.: 631,651

[22] Filed: Nov. 13, 1975

[30] Foreign Application Priority Data

Nov. 13, 1974 Germany .......................... 2453734

[51] Int. Cl.[2] .......................................... F16K 37/00

[52] U.S. Cl. .......................... 137/269; 137/505.25; 137/557; 251/366

[58] Field of Search .................. 137/505.25, 557, 269, 137/271; 251/366

[56] References Cited

U.S. PATENT DOCUMENTS

| | | | |
|---|---|---|---|
| 2,745,430 | 5/1956 | Slomer | 137/505.25 X |
| 3,426,790 | 2/1969 | Dey | 137/505.25 X |
| 3,472,292 | 10/1969 | Godfrey | 137/505.25 X |
| 3,495,607 | 2/1970 | Shugarman | 137/557 X |
| 3,698,425 | 10/1972 | Fisher | 137/505.25 |
| 3,719,160 | 3/1973 | Christianson | 137/557 X |
| 3,834,417 | 9/1974 | Holben et al. | 137/269 X |
| 3,910,222 | 10/1975 | Metivier | 137/557 X |

*Primary Examiner*—William R. Cline
*Attorney, Agent, or Firm*—Craig & Antonelli

[57] ABSTRACT

A control and signal arrangement for respirators which includes a service or supply block provided with bores for receiving a pressure reducer and/or an alarm mechanism. The pressure reducer and/or the alarm mechanism are fashioned as individual detachably mounted modules. The supply or service block communicates with a compressed gas reservoir with at least one supply bore being provided in the supply block for communicating the compressed gas reservoir with the pressure reducer and/or the alarm mechanism. The pressure reducer module and/or the alarm mechanism module includes radial bores which function as gas supply bores. The radial bores terminate in continuous grooves extending around the individual modules whereby the modules can be inserted into the supply block independently of any specific angular position.

53 Claims, 3 Drawing Figures

CONTROL AND SIGNAL ARRANGEMENT FOR RESPIRATORS

The present invention relates to a control and signal arrangement, more particularly to a control and signal arrangement for a compressed gas respirator wherein a compressed gas is fed to a lung controlled dosing or metering valve by way of a pressure reducer with a warning or signaling mechanism being exposed to the inlet gas pressure to indicate a drop below a predetermined minimum value of the inlet gas pressure ambient in the compressed gas reservoir.

In known respirators, utilized mostly as a protective breathing apparatus, the compressed gas reservoir is normally stored under a considerable inlet pressure in at least one tank or bottle carried on the user's back. A pressure reducer, connected indirectly or directly to the tank or bottle, serves for decreasing the inlet pressure to a medium pressure desired at the inhaling valve of the breathing mask or the like. In some instances a warning or alarm mechanism is also provided which is actuated when the compressed gas reservoir drops below a certain, in most cases settable, predetermined minimum value thereby preventing the user of the respirator from being suprised with an exhausted compressed gas supply when the respirator is deployed under conditions which do not permit a rapid escape from a dangerous situation. The warning or alarm mechanism may be of an acoustic or optical type or can be a mechanism which is effective on the breathing resistance of the respirator.

One disadvantage of conventional respirators resides in the fact that the pressure reducer and, in some cases, the signal or alarm mechanism requires several coupling and mounting connections and form a structural unit with a respirator. By virtue of this conventional construction the pressure reducer and the signal or alarm mechanism are subject to increased danger of external damage. Furthermore, an additional disadvantage resides in the fact that, in case of a defect, the repair and/or exchange of the pressure reducer and/or the alarm mechanism cannot be readily accomplished and such repair and/or exchange is extremely cumbersome. Thus, the conventional respirators must normally be returned to the manufacturer for repair and/or exchange purposes so that the repair and/or exchange can be performed by experts taking into account all of the strict safety regulations applicable to respirators. This conventional repair procedure is not only time consuming and expensive but, above all, also makes the individual respirator unavailable for several weeks in case of a defect.

The present invention is concerned with the task of providing a structurally simple control and alarm mechanism for a respirator which operates reliably while eliminating the aforementioned shortcomings encountered in the prior art.

According to the present invention, the pressure reducer and/or the signal or alarm mechanism are fashioned as modules which are detachably mounted in bores provided in a service or supply block which communicates with a compressed gas reservoir. The modules include gas connections which essentially are in the form of radial bores with annular seals being arranged around the modules. The individual modules are plugged or inserted into the bores of the supply block and engage an abutment which defines the insertion depth of the modules. The bores in the supply block have a cross-section which corresponds to the cross-section of the respective modules thereby facilitating the detachable mounting of the individual modules in the supply block. The supply block, starting at the connection with the compressed gas reservoir, has at least one supply bore for supplying compressed gas to the pressure reducer module and/or the signal or alarm device. The radial bores provided in the pressure reducer module and the signal or alarm device terminate in annular grooves extending continuously between the adjacent annular seals at the modules.

By virtue of the above described features in accordance with the present invention, the pressure reducer and/or the alarm mechanism, fashioned as modules, can be plugged into the supply or service block in the manner of a replaceable cartridge thereby safely establishing all coupling connections by means of one operating step, namely, insertion into the bores provided in the supply block, without the need for an expert's supervision and control. The individual modules, inserted in the manner of a cartridge can, in case of a defect, readily be pulled out by releasing their fastening means and can be replaced by an intact module. The replacement operation of the individual modules can take place without any appreciable time consumption so that the respirator equipped in accordance with the present invention is ready for use practically constantly with the only concern being the maintenance of a store of additional pressure reducers and/or alarm mechanisms as replacement parts. Even in the form of such replacement parts, the pressure reducers and alarm mechanisms, by virtue of their construction, do not represent a substantial cost factor.

According to a further feature of the present invention the providing of the continuous grooves into which terminate the radial bores of the pressure reducer and/or the alarm mechanism makes it possible to insert these modules basically independently of the specific angular position with respect to their longitudinal axis.

According to further advantageous features of the present invention, the individual modules are inserted into the supply block in a mutually parallel relationship and in the same plug-in direction with both modules having an equally large length section in the supply block. Furthermore, the radial bores, as well as the associated gas supply bores, are arranged, with respect to equal pressure conditions, in the zone of the same planes oriented at right angles to a longitudinal extension of the modules. By virtue of these features, in particular, the formation of the supply bores in the supply block is facilitated since it is more readily possible to provide longer passage bores associated with the pressure reducer and/or the alarm mechanism.

According to yet another feature of the present invention a spring or snap ring is provided which contacts the supply block and which is attached to the ends of the modules which extend through the supply block whereby a detachable mounting of the modules is readily realized.

In order to impart to the pressure reducer a configuration which is especially advantageous and compact along the lines of the problem to be solved herein, according to the present invention the pressure reducer is constructed as a pressure reducing valve having a cylindrical housing with a gas tight clamp-in diaphragm or a gas tight conducted piston arranged in the housing with one side of the piston or diaphragm being under the effect of a back pressure and the other side of the piston or diaphragm being under the action of a spring supported at the housing and having an adjustable force in opposition to the force exerted by the back pressure. The diaphragm or piston carries coaxially therewith a final control element or servo-element on which is disposed a valve cone responsive to the inlet gas pressure. The valve cone cooperates with a valve seat which may be integrally formed with the housing or provided on an axially adjustable insert member.

Another advantageous feature of the present invention resides in the fact that the final control element is fashioned as a control rod guided gas tight in a bore or guide of the housing on the side facing the inlet gas pressure. Other advantageous features of the present invention reside in the fact that the radial cross section of the gas tight guide and the valve seat are the same. Furthermore, an annular chamber is formed by the housing and surrounds the control rod between the valve cone and its gas tight guidance with the annular chamber being under the effect of the gas inlet pressure.

By virtue of the aforementioned features of the present invention, a slim structural configuration of the pressure reducer is realized which extends in only one axial direction. Furthermore, inasmuch as less, and smaller, components are required only a small amount of space is occupied by the pressure reducer in the axial as well as the radial directions. Also, a pressure reducer is realized which in independent of a fluctuating value of the inlet pressure with respect to the back pressure delivered by the pressure reducer.

In order to impart to the alarm mechanism a configuration which is especially advantageous and compact, according to the present invention the alarm mechanism is constructed with a cylindrical housing having a dual-acting piston axially displaceable therein. The piston is exposed on both sides thereof to the inlet gas pressure and includes a large piston area and a small piston area. However, the larger piston area of the piston may be exposed to a back pressure and the smaller piston area to the inlet gas pressure.

According to a further feature of the present invention the larger piston area of the piston of the alarm mechanism is provided with a sealing element such as a sealing disc which is axially displaceable to a limited extent and/or flexurally elastic and which, when the alarm mechanism is turned off, is in close contact with an annular sealing edge of a bore leading to the alarm mechanism, under the effect of the pressure acting on the smaller piston area and, in case of inlet pressure exposure, against the action of an adjustable compression spring effective on the piston of the alarm mechanism side. The piston area exposed to the inlet or back pressure outside of the sealing edge, as well as the compression spring, are dimensioned relatively to the smaller piston area so that the piston, when a certain inlet pressure has not be reached, lifts off the sealing edge.

By virtue of the aforementioned features of the alarm mechanism a slim construction is realized with the elements of the mechanism being arranged exclusively in coaxial succession thereby making it possible to employ the alarm mechanism as a cartridge-like exchangeable component.

Moreover, the above described alarm mechanism functions so that it does not only consume less compressed gas but also simultaneously evokes a more pronounced signaling effect. This feature applies not only within the scope of the present invention but is also generally valid.

Additionally, in accordance with the present invention, in case a pressure indicator or the like for the inlet pressure is employed, the provision may be made that the alarm mechanism extends through the supply block and is penetrated via a transverse bore provided at that location by a connecting pipe for the pressure indicator or the like. The connecting pipe being supported with respect to the supply block in the axial direction of the alarm mechanism. Also, the free end of the connecting pipe is supported with respect to the alarm mechanism housing by a spring ring or snap clip attached thereto with the transverse bore being in communication, via an axial bore with the alarm mechanism with the space for the piston with the smaller piston area. Furthermore, the connecting pipe is in communication with an axial bore via a radial bore arranged in the connecting pipe between annular gaskets or sealing elements. By virtue of this construction, with the use of only one spring ring or snap clip, the alarm mechanism as well as the connecting pipe for the pressure indicator extending therethrough at the bottom are secured in the form of a dual plug-in connection which simultaneously makes it possible to arrange the alarm mechanism and to provide a measuring instrument in a simple and compact manner.

In accordance with the present invention, the features described in connection with the alarm mechanism can also be implemented in connection with the pressure reducer and the front end of the pressure reducer, as seen in the plug-in direction, may project past the supply block with an extension into which a connecting pipe for a pressure indicator can be inserted by way of a transverse bore with the connecting pipe being placed in communication with the inlet pressure side of the pressure reducer by way of an axial bore or an axially parallel bore.

Accordingly, it is an object of the present invention to provide a control and alarm mechanism for a respirator which avoids by simple means the aforementioned shortcomings and drawbacks encountered in the prior art.

Another object of the present invention resides in providing a control and alarm mechanism for a respirator which is relatively simple in construction, occupies a minimum amount of space, and is relatively inexpensive to manufacture.

A further object of the present invention resides in providing a control and alarm mechanism for a respirator whereby, in case of a defect in either the control and/or alarm mechanism, a repair can readily be conducted on the spot by an unskilled person without the danger of not observing existing safety regulations.

A still further object of the present invention resides in providing a control and alarm mechanism for a respirator which is considerably reduced in structural size so that it can be accommodated easily at an external location of the respirator which location is little exposed to mechanical effects or stresses.

These and further objects, features and advantages of the present invention will become more apparent from the following description when taken in connection with the accompanying drawing which shows, for the purposes of illustration only, several embodiments in accordance with the present invention, and wherein.

Figure 1:
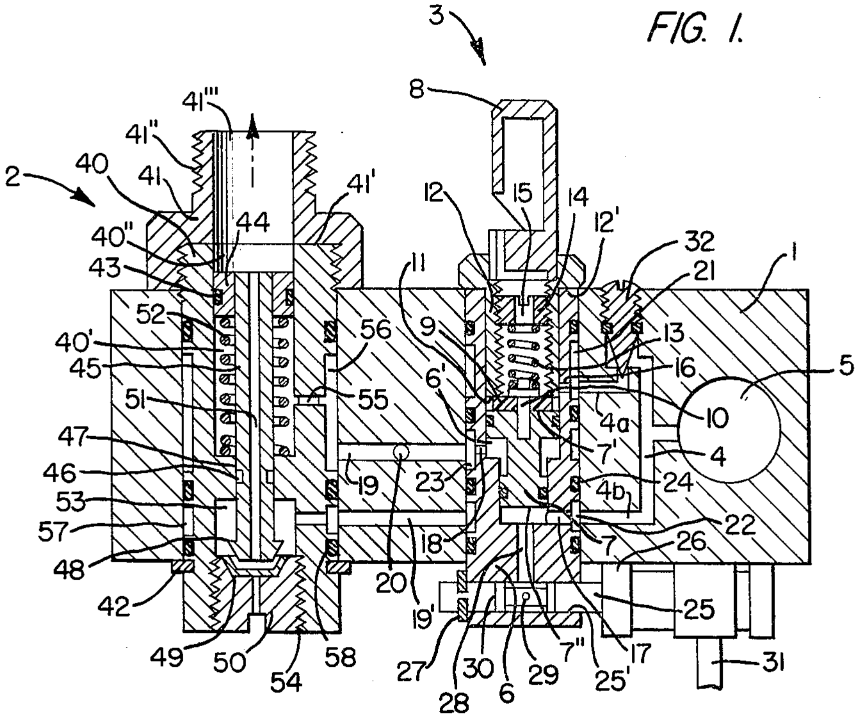
FIG. 1 is a cross-sectional view of a supply block with a pressure reducer and alarm mechanism disposed therein in accordance with the present invention.

Referring now to the drawings wherein like reference numerals are used throughout the various views to designate like parts and more particularly to FIG. 1, a supply block 1, preferably of aluminum, has mounted therein a pressure reducer generally designated by the reference numeral 2 and a signal or alarm device generally designated by the reference numeral 3. A compressed gas reservoir (not shown) communicates with the supply block 1 by way of bores 4, 5 whereby the inlet gas pressure at the supply block 1 corresponds to the ambient pressure of the gas in the gas reservoir. The gas reservoir is connected with the supply block by a suitable conventional coupling (not shown) with a screw cap (not shown) being pressed into the bore of the supply block 1.

The signal device 3 includes a cylindrical housing 6 having a double-acting piston 7 axially displaceably mounted therein with a whistle 8 or other alarm device provided at one end of the housing 6. The bore 4 includes two branches 4*a*, 4*b* which communicate with the interior of the housing 6 whereby the gas pressure acts upon an upper larger piston area 7′ and a lower smaller piston area 7″ so that the piston 7 is under the effect of the inlet gas pressure from both sides thereof. An elastic sealing disk 9, of rubber or other synthetic resinous material is attached to the piston 7 at the large piston area 7′ by a screw 10 of the like. When the whistle 8 is inoperative or shut off, the sealing disk 9 contacts an annular sealing edge 11 of a threaded insert element 12. The insert element 12 forms at its upper end an abutment 12′0 which defines the inserted position of the signal whistle 8 in the supply block 1. A compression spring 13 is held within the threaded insert element 12 by a screw plug 14 with the spring 13 resting against the screw 10 and the piston 7. The screw plug 14 has a central bore 15 whereby gas can be fed to the whistle 8 in a manner described more fully hereinafter.

The housing 6 is provided with radial bores 16, 17 for supplying compressed gas from the gas reservoir to the interior of the housing 6. A radial bore 18 connects the space 6′ between the piston areas 7′, 7″ of the piston 7 with the surroundings by way of a conduit 19 and a bore 20. The radial bores 16, 17 and 18 respectively terminate in associated continuous grooves 21, 22, 23 whereby it is possible to insert the signal device 3 into the supply block 1 in any desired angular position. On both sides of the radial bores 16, 17, 18 and/or the associated grooves 21, 22, 23 the housing 6 is provided with ring seals 24, for example, in the form of O-rings, which separate from one another the different pressure ranges to which the signal device 3 is exposed.

The housing 6 is inserted into the supply block 1 with the end of the housing facing away from the whistle 8 extending beyond the extent of the supply block 1. A connecting pipe 25 is inserted in a transverse bore 25′ provided in the housing 6. The connecting pipe 25 is preferably provided with a square end 26 which rests on one side against the supply block 1. A spring ring 27 is provided on the connecting pipe 25 for preventing the connecting pipe from sliding out of the housing 6. The connecting pipe 25 communicates with the inlet pressure from the gas reservoir via an axial bore 28 of the housing 6, as well as a radial bore 29 arranged between ring seals 30. By virtue of this construction the inlet pressure is then conducted via a conduit 31 to a pressure indicator or the like (not shown). Furthermore, by virtue of the spring ring secured to the end of the connecting pipe, the entire signal device may readily be detached from the supply block 1 by release of the spring ring 27 and removal of the connecting pipe 25 from the bore 25′.

The mode of operation of the above-described simple device 3 is as follows:

As long as the value for the inlet pressure ambient in the compressed gas reservoir does not drop below a predetermined minimum value, the force exerted by the inlet pressure on the smaller area 7″ of the piston 7 is sufficient to maintain the piston 7 and thus the sealing disk 9 in contact with the annular sealing edge 11 against the force of the compression spring 13 and also against the force exerted by the inlet pressure on the annular surface of the piston located outside of the sealing edge 11.

Once the inlet pressure drops to a value below the predetermined minimum value, the compression spring 13 overcomes the force resulting from the combined forces exerted on the piston 7 thereby displacing the piston 7 in a downward direction with respect to FIG. 1. Since the inlet pressure is also ambient between the piston 7 and the sealing disk 9, the sealing disk, during the downward movement of the piston 7, is first held in contact with the annular sealing edge 11 by the inlet pressure until it is torn off from the sealing edge 11 during the further downward movement of the piston due to an internal stress caused by deformation of the sealing disk 9. At this moment, the inlet pressure from the gas can then flow from the bore 4*a*, through bore 16 about the sealing edge 11 and to the whistle 8 via the bore 15 thereby causing the whistle signal. To keep the loss of compressed gas at a minimum during the signaling, the quantity of compressed gas which can flow per unit time to the whistle end 8 is limited by a conventional, adjustable throttle screw 32. Due to the fact that the inlet pressure ambient on the side 7′ of the piston 7 is now reduced, the inlet pressure still fully effective on the side 7″ of the piston 7 facing away from the whistle again predominates over the bias of the compression spring 13, so that the piston 7 is shifted upwardly and the whistle is turned off again. At this point in time, the inlet pressure can again be built up on the side 7′ of the piston 7 and the aforedescribed procedure begins anew so that, when the intended miminum inlet pressure, adjustable by the bias of the compression spring 13 is not reached, an interval-type whistle tone results wherein the lengths of the intervals become increasingly larger with the decreasing inlet pressure until finally an uninterrupted whistle tone results. Accordingly, the user of the respirator is alerted with increasing intensity to the fact that the compressed gas reservoir is close to depletion and with the signal being accomplished in a manner utilizing a comparatively very minor amount of compressed gas from the compressed gas reservoir.

In lieu of the compression spring 13, it is also possible in accordance with the present invention to connect the side 7′ of piston 7 to a medium pressure supplied by the pressure reducer 2. This connection can be accomplished by providing a corresponding transverse bore in the supply block 1. The medium pressure supplied by the pressure reducer 2 remains constant also in the case of a falling inlet pressure, so that it can take care, with the inlet pressure dropping, of the shifting of the force ratio effective on the piston 7 which finally leads to the displacement of the piston 7 and the actuation of the signal whistle 8.

Figure 2:
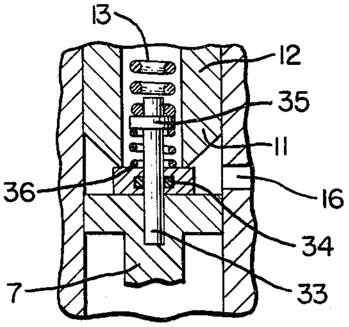
FIG. 2 is a partial cross-sectional view of a modified construction of the alarm mechanism in accordance with the present invention.

A somewaht modified structure of the signal device 3 is shown in FIG. 2. In this construction, an annular ring plate or disk 34 is provided and is axially displaceable to a limited extent on a pin 33 threadably inserted on the side 7' of the piston 7. A collar 35 is provided on the pin 33 with one end of the compression spring 13 resting against the collar 35. A further spring is arranged between the collar 35 and the plate or disk 34. As indicated hereinabove, the spring 13 may be replaced by supplying a medium pressure from the pressure reducer 2 to the side 7' of the piston 7 through a transverse bore in the supply block 1. The annular plate or disk 34 remains in contact with the sealing edge 11 during a downward movement of the piston 7 as described above until the spring 36 has been pretensioned to such an extent that it can force the disk 34 off the sealing edge 11 against the effect of the inlet pressure or the medium pressure whereby the gas flows from the bore 16 around the sealing edge 11 to the signal whistle 8.

As shown in FIG. 1, the pressure reducer 2 is fashioned as a regulating or reducing valve having a cylindrical housing 40 sealed or closed off at the top by a cap or closure lid 41 which may be threadably inserted into the housing 40 or secured thereto by suitable conventional fasteners (not shown). The cap 41 forms an abutment 41' for limiting or defining the insertion depth of the pressure reducer 2 in the supply block 1. Additionally, the cap 41 has a connecting flange 41" on the back pressure side thereof for connecting with a supply line (not shown) which supply line leads to a breathing mask (not shown) or the like. To securely fix the pressure reducer 2 in the supply block 1 and prevent any sliding out, a spring ring 42 is provided which is seated on the end of the pressure reducer 2 which extends through the supply block 1.

A piston 44 is displaceably mounted in a bore 40' in the housing 40. At least one sealing element or gasket 43 is provided for ensuring a fluid tight guided displacement of the piston 5 in the bore 40'.

A rod 45 is connected to the piston 44, for example, by a threaded connection, and is displaceable with the piston 44 in a bore 47 of the housing 40. At least one sealing element or gasket 46 is provided for ensuring a fluid-tight displacement of rod 45 in the bore 47.

A valve cone 48 is provided at one end of the rod 45 and cooperates with a valve seat 49 which may be formed of a rubber or other synthetic resinous material. The valve seat 49 is carried by an insert member 50 which is, for example, threadably connected to the housing 40 so as to be axially displaceable within the housing 40. The insert member 50 is disposed in the housing so as to be coaxial with the rod 45.

The rod 45 includes a central bore 51 which extends through the valve cone 48 and penetrates the upper surface of the piston 44 to communicate with a back pressure space 40". A compression spring 52 is disposed within the bore 40' having one end resting or abutting against a wall portion of the housing 40 in front of the seal or gasket 46 and the other end portion abutting the side of the piston 44 opposite the back pressure space 40". The spring 52 normally biases the piston 44 and the rod 45 in the direction of the cap 41.

An annular chamber 53 is defined between a wall portion below the seal 46 and an upper surface or end of the valve seat 49. The chamber 53 is in communication by way of bore 54, conduit 19' and conduit 4 with a suitable gas reservoir (not shown). A bore 41''' is provided in the cap or lid 40 for releasing or supplying the gas under a back pressure or intermediate pressure to the location at which it is to be used.

The mode of operation of the pressure reducer 2 is as follows:

The desired back or intermediate pressure for the pressure reducer 2 is determined and the valve seat 49 and valve cone 48 are adjusted by axially adjusting the insert member 50 and valve seat 49 whereby a predetermined spaced relationship is established between the valve cone 48 and the valve seat 49.

Gas or the like at the ambient pressure in the gas reservoir (not shown) is fed into the annular chamber 53 by way of the bores 19', 54 with the gas acting in axially opposed directions equally on the surfaces formed at the seal 46 and the valve cone 48. Thus, the inlet pressure of the gas cannot exert a resultant axial force on the piston 44, rod 45 and valve cone 48 to displace the same since the diameter of the rod 45 as well as the bore 47 and the diameter of the valve seat 49 are of equal size.

The gas in the annular chamber 53 flows through the central bore 51 into the back pressure space 40". The pressure of the gas in the back pressure space 40" rises and exerts a force on the piston 44 from above the surface thereof which force counteracts the force of the pretensioned compression spring 52. Upon the pressure in the back pressure space 40" reaching a value sufficient to overcome the bias of the spring 52, the piston 44 as well as the rod 45 are displaced in the downward direction with respect to FIG. 1 against the bias of the spring 52 to close the communication between the annular chamber 53 and the back pressure space 40".

Upon the back pressure in the back pressure space 40" decreasing and reaching a value insufficient to counteract the force of the spring 52, the piston 44, as well as the rod 45 is displaced in the upward direction with respect to FIG. 1 whereby the valve cone 48 is then lifted off the valve seat 49 to re-establish communication between the back pressure space 40" and the annular chamber 53 whereby the gas present under the inlet pressure in the annular chamber 53 can pass the valve seat 49 and enter the back pressure space 40" by way of the central bore 51 until a pressure increase is reached in the back pressure space 40" which is sufficient for displacing the valve cone 48 into engagement with the valve seat 49 against the force of the spring 52. After the pressure increase, exactly the set back pressure is again ambient in the pressure space 40".

The mode of operation of the pressure reducer 2 of the present invention is independent of the level of the inlet pressure ambient in the annular chamber 53, since the inlet pressure cannot have any effect on the play of forces caused by the spring 52 and by the piston 44 under the back pressure. Of course, it is self evident that the valve cone 48 remains displaced from the valve seat 49 if the inlet pressure drops below the magnitude required for the set back pressure.

To prevent any impediment to the motion of the piston 44 and/or to the actuation of the valve cone 48 toward and away from the valve member 49, a venting bore 55 is provided in the housing 4. The venting bore 55 is in communication with the exterior of the supply block by way of conduit 19 and bore 20.

As in the case of the signal or alarm device 3, radial bores 54, 55 of the pressure reducer 2 terminate into continuous grooves 56, 57 with annular gaskets 58 being arranged to maintain a gas tight construction with the annular gaskets being in the form of O-rings.

Figure 3:
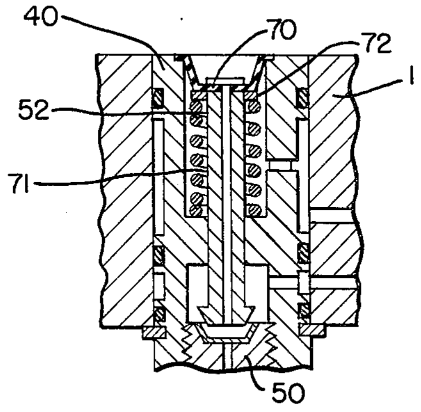
FIG. 3 is a partial cross-sectional view of a modified construction of a pressure reducer in accordance with the present invention.

FIG. 3 provides a somewhat modified structure of the pressure reducer 2 with the piston 44 being replaced by a diaphragm member 70 clamped within the housing 40 to which diaphragm member a rod 71 is connected by a hinged or pivotal attachment centrally thereof in a fluid tight manner. The diaphragm 70 may include a stiffened area and/or a plate 72 in the central zone thereof for introducing the force exerted by the spring 52. As readily apparent the modified construction of the pressure reducer in FIG. 3 operates in the same manner as the pressure reducer of FIG. 1.

While the pressure reducer and signal or alarm device 3 have been described hereinabove as being fashioned as modules having a cylindrical cross-section, it is understood that it is also possible to fashion the modules so as to have an oval or polygnal cross-section. Additionally, it is understood that the principles of the present invention are applicable also to other alarm devices other than a whistle and, for example, the alarm mechanism may be constituted by a siren, bell or the like. Furthermore, the alarm mechanism may be constituted by an optical type alarm or a mechanism which is effective on the breathing resistance of the respirator.

While I have shown and described several embodiments in accordance with the present invention, it is understood that the same is not limited thereto but is susceptible of numerous changes and modifications as apparent to one skilled in the art. Therefore, I do not wish to be limited to the details shown and described herein but intend to cover all such modifications as are encompassed by the scope of the appended claims.

I claim:

1. A control arrangement for controlling a compressed fluid respirator in which a compressed fluid is fed from a compressed fluid reservoir to a dosing valve, the arrangement comprising: a pressure reducing means for reducing a fluid inlet pressure from the compressed fluid reservoir to an intermediate or back pressure, a fluid pressure supply block means, receiving means provided in said supply block means for receiving said pressure reducing means including at least one first bore extending through said supply block means, said pressure reducing means being fashioned as an independent module and including a housing means inserted in said at least one first bore, said receiving means and said pressure reducing means having a substantially identical cross-sectional configuration, fastening means for selectively fastening said pressure reducing means in said supply block means, said pressure reducing means including at least one radial bore terminating in a continuous groove extending around the housing means for communicating said pressure reducing means with said supply block means, and wherein said supply block means includes at least one supply bore communicating with said continuous groove.

2. An arrangement according to claim 1, further comprising an alarm means arranged at said supply block means for providing a signal indicative of a drop of the inlet pressure of the compressed fluid below a predetermined minimum.

3. An arrangement according to claim 2, wherein said alarm means is fashioned as an independent module detachably mounted in a receiving means provided in said supply block means.

4. An arrangement according to claim 3, wherein the receiving means of said pressure reducing means and said alarm means are fashioned as bores such that said pressure reducing means and said alarm means are inserted by plugging said pressure reducing means and said alarm means into said bores.

5. An arrangement according to claim 4, wherein a stop means is provided at said supply block means for limiting the insertion depth of the pressure reducing means and said alarm means.

6. A control arrangement for controlling a compressed fluid respirator in which a compressed fluid is fed from a compressed fluid reservoir to a dosing valve, the arrangement comprising: a pressure reducing means for reducing a fluid inlet pressure from the compressed fluid reservoir to an intermediate or back pressure, a fluid pressure supply block means, receiving means provided in said supply block means for receiving said pressure reducing means including at least one first bore extending through said supply block means, said pressure reducing means being fashioned as an independent module including a housing means inserted in said at least one first bore, said receiving means and said pressure reducing means having a substantially identical cross-sectional configuration, fastening means for selectively fastening said pressure reducing means in said supply block means, said pressure reducing means including at least one radial bore terminating in a continuous groove extending around the housing means for communicating said pressure reducing means with said supply block means, said supply block means including at least one supply bore communicating with said continuous groove, at least one annular sealing means extending around said housing means for sealing said housing means in said supply block means, and an alarm means for providing a signal indicating a drop of the inlet pressure of the compressed fluid below a predetermined minimum, a further receiving means provided in said supply block means for receiving said alarm means, said alarm means being fashioned as an independent module detachably mounted in said further receiving means, said further receiving means and said alarm means having a substantially identical cross-sectional configuration, fastening means for selectively fastening said alarm means in said supply block means, said alarm means including communicating means for communicating said alarm means with said at least one bore of said supply block means.

7. An arrangement according to claim 6, wherein said further receiving means includes at least one second bore extending through said supply block means, said alarm means includes a housing means inserted in said at least one second bore, said communicating means of said alarm means including at least one radial bore communicating with said at least one supply bore of said supply block means.

8. An arrangement according to claim 7, wherein at least one further annular sealing means is provided and extends around said housing means of said alarm means for sealing said alarm means in said supply block means.

9. An arrangement according to claim 8, wherein said at least one radial bore of said alarm means terminates in at least one continuous groove which extends around the housing means of said alarm means, said at least one supply bore communicating with said continuous groove of said alarm means.

10. An arrangement according to claim 9, wherein said at least one first bore and said at least one second bore are disposed in said supply block means in a spaced parallel relationship, said first and second bores having an identical axial length, and wherein said pressure reducing means and said alarm means each include abutment means for defining the respective insertion depth of said pressure reducing means and said alarm means in said supply block means.

11. An arrangement according to claim 10, wherein said at least one radial bore of said pressure reducing means, said at least one radial bore of said alarm means, and at least a portion of at least one supply bore are disposed substantially at a right angle to the longitudinal axis of said pressure reducing means and said alarm means, said pressure reducing means and said alarm means being inserted into said supply block means in the same insertion direction.

12. An arrangement according to claim 11, wherein said fastening means for said pressure reducing means and said fastening means for said alarm means each include a spring ring means, said housing means of said pressure reducing means and said alarm means extending through and projecting beyond said supply block means, said spring ring means contacting said supply block means and securing the respective projecting portions of said pressure reducing means and said alarm means to said supply block means.

13. An arrangement according to claim 12, wherein said pressure reducing means includes a pressure responsive element displaceably mounted in said housing means of said pressure reducing means, a fluid inlet chamber means provided in said housing means of said pressure reducing means for receiving a fluid under inlet pressure, a pressure space means defined by said housing means of said pressure reducing means and a surface of said pressure responsive element for accommodating a fluid under a predetermined back pressure, the pressure of the fluid in said pressure space means acting upon the surface of said pressure responsive element to urge the same in a first direction, means for communicating said fluid inlet chamber means with said pressure responsive means, a control means for selectively controlling the communication between said inlet chamber means and said pressure space means, means for connecting said control means to said pressure responsive element so as to be displaceable therewith, means for normally biasing said pressure reponsive element in a direction opposite to said first direction to maintain the communication between said fluid inlet chamber means and said pressure space means until the pressure in said pressure space means overcomes the force of said biasing means, and means communicating with said pressure space means for exhausting the fluid therefrom whereby the biasing means re-establishes the communication between said fluid inlet chamber means and said pressure space means.

14. An arrangement according to claim 13, wherein said pressure responsive element is a piston means, said housing means of said pressure reducing means including a first bore means for receiving said piston means, said piston means dividing said first bore means into a first and second pressure space, said first pressure space constituting said pressure space means and said second pressure space accommodating said biasing means, and means for fluid-tightly sealing said first pressure space means from said second pressure space means.

15. An arrangement according to claim 14, wherein said biasing means is a spring, one of said spring abutting a surface portion of said piston means and the other end thereof abutting a portion of said housing means of said pressure reducing means, said control means including a valve seat means disposed in said fluid inlet chamber means and a valve cone means mounted on said connecting means and cooperating with said valve seat means.

16. An arrangement according to claim 15, wherein said connecting means includes a rod member connected at one end thereof to said piston means and having provided on the other end thereof said valve cone means, a second bore means provided in said housing means of said pressure reducing means between said first bore means and said fluid inlet chamber means for receiving and guiding said rod member, and means for fluid tightly sealing said second bore means to prevent the flow of fluid from said fluid inlet chamber means through said second bore means into said first bore means.

17. An arrangement according to claim 16, wherein a wall member is provided in said housing means of said pressure reducing means for separating said pressure space means from said fluid inlet chamber means, said wall member having a first surface portion defining a terminating wall of said first bore means and a second surface portion defining a terminating wall of said fluid inlet chamber means, said second bore means being provided in said wall member and extending from said first surface portion thereof to said second surface portion thereof, and wherein said fluid inlet chamber means is an annular chamber surrounding said rod member between said valve cone means and the second surface portion of said wall member defining the teminating wall of said annular chamber.

18. An arrangement according to claim 17, wherein the cross sectional dimension of said second bore and said valve seat means are substantially identical.

19. An arrangement according to claim 18, wherein said means for communicating said fluid inlet chamber means with said pressure space means includes a fluid passage means extending through said valve cone means, said rod member and said piston means, and wherein fluid from said annular chamber flows through said passage means when said valve cone means is displaced from said valve seat means.

20. An arrangement according to claim 19, wherein said abutment means for said pressure reducing means includes a cap means connected to the housing means of said pressure reducing means, said cap means including a connecting flange means extending in the axial direction of said pressure reducing means for connecting said pressure reducing means with a supply line.

21. An arrangement according to claim 20, wherein said at least one supply bore includes branched passages, said alarm means includes a double-acting piston means disposed in said housing means of said alarm means, a whistle means mounted on said housing means, said double-acting piston means including a large piston area facing said whistle means and a smaller piston area, an annular chamber means surrounding said smaller piston area for receiving an inlet pressure from one of said branched passages of said supply bore, said at least one radial bore of said alarm means communicating said annular chamber means with said one of said branched passages, at least one further radial bore provided in said housing means of said alarm means for communicating said larger piston area with an inlet pressure from another of said branched passages of said supply bore, a sealing means mounted on said large piston area of said double-acting piston means, said sealing means being axially displaceable to a limited extent, an annular sealing edge including a bore communicating with said whistle means, means for biasing said double-acting piston means and said sealing means in a first direction, said biasing means and the inlet pressure in said annular chamber means surrounding said smaller piston area maintaining said sealing means in contact with said sealing edge whereby upon a decrease in the inlet pressure in said annular chamber means the inlet pressure effective on said larger piston area from said branched passage displaces said doubling-acting piston means and said sealing means away from said sealing edge to activate said whistle means.

22. An arrangement according to claim 21, wherein an adjustable throttle means is arranged in said branched passage means communicating with said large piston area.

23. An arrangement according to claim 21, wherein an indicator means is provided for indicating the inlet pressure of the fluid from the compressed fluid reservoir, said housing means of said alarm means extending beyond said supply block means at an end thereof opposite said whistle means, said housing means including a transverse bore extending therethrough, said pressure indicating means including a connecting pipe disposed in said transverse bore and being supported in the axial direction of said whistle means, said connecting pipe including a free end portion projecting beyond said transverse bore, said snap ring means for said alarm means being disposed on said free end of said connecting pipe, at least one axial bore means for communicating said transverse bore with said annular chamber means surrounding said small area of said double-acting piston means, at least one radial bore means for communicating said connecting pipe with said axial bore means, and sealing means spaced along the axial length of said connecting pipe for sealing said connecting pipe in said transverse bore, said at least one radial bore means being disposed in said connecting pipe between said spaced sealing means.

24. An arrangement according to claim 13, wherein said pressure responsive element is a diaphragm means, said housing means of said pressure reducing means including a first bore means for receiving said diaphragm means, said diaphragm means dividing said bore means into a first and second pressure space, said first pressure space constituting said pressure space means and said second pressure space accommodating said biasing means.

25. An arrangement according to claim 24, wherein said biasing means is a spring, one end of said spring abutting a surface portion of said diaphragm means, the other end of said spring engaging a portion of said housing means, said control means including a valve seat means disposed in said fluid inlet chamber means and a valve cone means mounted on said connecting means cooperating with said valve seat means.

26. An arrangement according to claim 25, wherein said connecting means includes a rod member secured at one end thereof to said diaphragm means and having provided on the other end thereof a valve cone means, a second bore means provided in said housing means between said first bore means and said fluid inlet chamber means for receiving and guiding said rod member, and means for fluid-tightly sealing said second bore means to prevent the flow of fluid from said fluid inlet chamber means through said second bore means into said first bore means.

27. An arrangement according to claim 26, wherein said means for communicating said fluid inlet chamber means with said pressure space means includes a fluid passage means extending through said valve cone means, said rod member and said diaphragm means, and wherein fluid from said fluid inlet chamber means flows through said passage means when said valve cone means is displaced from said valve seat means.

28. An arrangement according to claim 27, wherein said at least one supply bore includes branched passages, said alarm means includes a double-acting piston means disposed in said housing means of said alarm means, a whistle means mounted on said housing means, said double-acting piston means including a large piston area facing said whistle means and a smaller piston area, an annular chamber means surrounding said smaller piston area for receiving an inlet pressure from one of said branched passages of said supply bore, said at least one radial bore of said alarm means communicating said annular chamber means with said one of said branched passages, at least one further radial bore provided in said housing means of said alarm means for communicating said larger piston area with an inlet pressure from another of said branched passages of said supply bore, a sealing means mounted on said large piston area of said double-acting piston means, said sealing means being axially displaceable to a limited extent, an annular sealing edge including a bore communicating with said whistle means, means for biasing said double-acting piston means and said sealing means in a first direction, said biasing means and the inlet pressure in said annular chamber means surrounding said smaller piston area maintaining said sealing means in contact with said sealing edge whereby upon a decrease in the inlet pressure in said annular chamber means the inlet pressure effective on said larger piston area from said branched passage displaces said double-acting piston means and said sealing means away from said sealing edge to activate said whistle means.

29. An arrangement according to claim 28, wherein an indicator means is provided for indicating the inlet pressure of the fluid from the compressed fluid reservoir, said housing means of said alarm means extending beyond said supply block means at an end thereof opposite said whistle means, said housing means including a transverse bore extending therethrough, said pressure indicating means including a connecting pipe disposed in said transverse bore and being supported in the axial direction of said whistle means, said connecting pipe including a free end portion projecting beyond said transverse bore, said snap ring means for said alarm means being disposed on said free end of said connecting pipe, at least one axial bore means for communicating said transverse bore with said annular chamber means surrounding said small area of said double-acting piston means, at least one radial bore means for communicating said connecting pipe with said axial bore means, and sealing means spaced along the axial length of said connecting pipe for sealing said connecting pipe in said transverse bore, said at least one radial bore means being disposed in said connecting pipe between said spaced sealing means.

30. A control arrangement for controlling a compressed fluid respirator in which a compressed fluid is fed from a compressed fluid reservoir to a dosing valve, the arrangement comprising: a pressure reducing means for reducing a fluid inlet pressure from the compressed fluid reservoir to an intermediate or back pressure, a fluid pressure supply block means, receiving means provided in said supply block means for receiving said pressure reducing means, said pressure reducing means being fashioned as an independent module detachably mounted in said receiving means, said receiving means and said pressure reducing means having a substantially identical cross-sectional configuration, fastening means for selectively fastening said pressure reducing means in said supply block means, said pressure reducing means including communicating means for communicating said pressure reducing means with said supply block means, said supply block means includes communication means for communicating the compressed fluid reservoir with the communicating means of said pressure reducing means, and an alarm means for providing a signal indicating a drop of the inlet pressure of the compressed fluid below a predetermined minimum, a further receiving means provided in said supply block means for receiving said alarm means, said alarm means being fashioned as an independent module detachably mounted in said further receiving means, said further receiving means and said pressure reducing means having a substantially identical cross-sectional configuration, fastening means for selectively fastening said alarm means in said supply block means, said alarm means including communicating means for communicating said alarm means with said communicating means of said supply block means.

31. An arrangement according to claim 30, wherein said pressure reducing means includes a housing means, a pressure responsive element displaceably mounted in said housing means, a fluid inlet chamber means in said housing means for receiving a fluid under an inlet pressure, a pressure space means defined by said housing means and a surface portion of said pressure responsive element for accommodating a fluid under a predetermined back pressure, the pressure of said fluid in said pressure space means acting upon the surface of said pressure responsive element to urge the same in a first direction, means for communicating said fluid inlet chamber means with said pressure space means, a control means for selectively controlling the communication between said inlet chamber means and said pressure space means, means for connecting said control means to said pressure responsive element so as to be displaceable therewith, means for normally biasing said pressure responsive element in a direction opposite to said first direction to maintain the communication between said first inlet chamber means and said pressure space means until the pressure in said pressure space means overcomes the force of said biasing means, and means communicating with the pressure space means for exhausting the fluid therefrom whereby the biasing means reestablishes the communication between said fluid inlet chamber means and said pressure space means.

32. An arrangement according to claim 31, wherein said pressure responsive element is a piston means, said housing means including a first bore means for receiving said piston means, said piston means dividing said first bore means into a first and second pressure space, said first pressure space constituting said pressure space means and said second pressure space accommodating said biasing means, and means for fluid-tightly sealing said first pressure space means from said second pressure space.

33. An arrangement according to claim 32, wherein said biasing means is a spring, one end of said spring abuttng a surface portion of said piston means and the other end thereof abutting a portion of said housing means, said control means including a valve seat means disposed in said fluid inlet chamber means and a valve cone means mounted on said connecting means and cooperating with said valve seat means.

34. An arrangement according to claim 31, wherein said pressure responsive element is a diaphragm means, said housing means including a first bore means for receiving said diaphragm means, said diaphragm means dividing said first bore means into a first and second pressure space, said first pressure space constituting said pressure space means and said second pressure space accommodating said biasing means.

35. An arrangement according to claim 34, wherein said biasing means is a spring, one end of said spring abutting a surface portion of said diaphgram means, the other end of said spring engaging a portion of said housing means, said control means including a valve seat means disposed in said fluid inlet chamber means and a valve cone means mounted on said connecting means cooperating with said valve seat means.

36. An arrangement according to claim 30, wherein said communication means of said supply block means includes at least one supply bore having branched passages, said alarm means includes a housing means accommodating a double-acting piston means, a signal means mounted on said housing means, said double-acting piston including a large piston area facing said signal means and a smaller piston area, an annular chamber means surrounding said smaller piston area for receiving an inlet pressure from one of said branched passages of said supply bore, said communicating means of said alarm means communicating said annular chamber means with said one of said branched passages, a radial bore means provided in said housing means for communicating said larger piston area with an inlet pressure from the other of said branched passages of said supply bore, a sealing means mounted on said large piston area of said double-acting piston means, an annular sealing edge including a bore communicating with said signal means, means for biasing said double-acting piston means and said sealing means in a first direction, said biasing means and the inlet pressure in said annular chamber means surrounding said smaller piston area maintaining said sealing means in contact with said sealing edge whereby upon a decrease in the inlet pressure in said annular chamber means the inlet pressure effective on said larger piston area from said branched passage displaces said double-acting piston means and said sealing means away from said sealing edge to activate said signal means.

37. An arrangement according to claim 36, wherein an adjustable throttle means is arranged in said branched passage means communicating with said large piston area.

38. An arrangement according to claim 37, wherein an indicator means is arranged at said supply block means for indicating the inlet pressure of the fluid from the compressed fluid reservoir.

39. A control arrangement for controlling a compressed fluid respirator in which a compressed fluid is fed from a compressed fluid reservoir to a dosing valve, the arrangement comprising: a pressure reducing means for reducing a fluid inlet pressure from the compressed fluid reservoir to an intermediate or back pressure, a fluid pressure supply block means, receiving means provided in said supply block means for receiving said pressure reducing means, said pressure reducing means being fashioned as an independent module detachably mounted in said receiving means, said receiving means and said pressure reducing means having a substantially identical cross-sectional configuration, fastening means for selectively fastening said pressure reducing means in said supply block means, said pressure reducing means including communicating means for communicating said pressure reducing means with said supply block means, said supply block means includes communication means for communicating the compressed fluid reservoir with the communicating means of said pressure reducing means, and an alarm means, further receiving means provided in said supply block means for receiving said alarm means, said alarm means including a housing means mounted in said supply block means, a double-acting piston means disposed in said housing means, a whistle means mounted on said housing means, said communicating means of said supply block means including a supply bore having branched passages communicating with said alarm means, said double-acting piston means including a large piston area facing said whistle means and a small piston area, an annular chamber means surrounding said small piston area for receiving an inlet pressure from one of said branched passages of said supply bore, a sealing means mounted on said large piston area of said double-acting piston means, said sealing means being axially displaceable to a limited extent, an annular sealing edge including a bore communicating with said whistle means, means for biasing said double-acting piston means and said sealing means in a first direction, said biasing means and the inlet pressure in said annular chamber means surrounding said small piston area maintaining said sealing means in contact with said sealing edge whereby upon a decrease in the inlet pressure in said annular chamber means the inlet pressure effective on said larger piston area from said branched passage displaces said piston means and said sealing means away from said sealing edge to activate said whistle means.

40. An arrangement according to claim 39, wherein said biasing means is a compression spring.

41. An arrangement according to claim 39, wherein said supply block means includes a bore means for communicating said pressure reducing means with said large piston area of said double-acting piston whereby a fluid pressure from said pressure reducing means is effective upon said large piston area and functions as said biasing means.

42. A control arrangement for controlling a compressed fluid respirator in which a compressed fluid is fed from a compressed fluid reservoir to a dosing valve, the arrangement comprising: a pressure reducing means for reducing a fluid inlet pressure from the compressed fluid reservoir to an intermediate or back pressure, a fluid pressure supply block means, receiving means provided in said supply block means for receiving said pressure reducing means, said pressure reducing means being fashioned as a complete functionally operational independent module detachably mounted in said receiving means, said receiving means and said pressure reducing means having a substantially identical cross-sectional configuration, fastening means for selectively fastening said pressure reducing means in said supply block means, said pressure reducing means including communicating means for communicating said pressure reducing means with said supply block means, and wherein said supply block means includes communication means for communicating the compressed fluid reservoir with the communicating means of said pressure reducing means, and wherein said pressure reducing means includes a housing means having a pressure responsive element mounted therein, a fluid inlet chamber means provided in said housing means of said pressure reducing means for receiving a fluid under inlet pressure, a pressure space means defined by said housing means of said pressure reducing means and a surface of said pressure responsive element for accommodating a fluid under a predetermined back pressure, the pressure fluid in said pressure space means acting upon the surface of said pressure responsive element to urge the same in a first direction, means for communicating said fluid inlet chamber means with said pressure responsive means, a control means for selectively controlling the communication between said inlet chamber means and said pressure space means, means for connecting said control means to said pressure responsive element so as to be displaceable therewith, means for normally biasing said pressure responsive element in a direction opposite to said first direction to maintain the communication between said first inlet chamber means and said pressure space means until the pressure in said pressure space means overcomes the force of said biasing means, and means communicating with said pressure space means for exhausting the fluid therefrom whereby the biasing means re-establishes the communication between said first inlet chamber means and said pressure space means.

43. An arrangement according to claim 42, wherein said pressure responsive element is a piston means, said housing means of said pressure reducing means including a first bore means for receiving said piston means, said piston means dividing said first bore means into a first and second pressure space, said first pressure space constituting said pressure space means and said second pressure space accommodating said biasing means, and means for fluid-tightly sealing said first pressure space means for said second pressure space means.

44. An arrangement according to claim 43, wherein said biasing means is a spring, one end of said spring abutting a surface portion of said piston means and the other end thereof abutting a portion of said housing means of said pressure reducing means, said control means including a valve seat means disposed in said fluid inlet chamber means and a valve cone means mounted on said connecting means and cooperating with said valve seat means.

45. An arrangement according to claim 44, wherein said connecting means includes a rod member connected at one end thereof to said piston means and having provided on the other end thereof said valve cone means, a second bore means provided in said housing means of said pressure reducing means between said first bore means and said fluid inlet chamber means for receiving and guiding said rod member, and means for fluid tightly sealing said second bore means to prevent the flow of fluid from said fluid inlet chamber means through said second bore means into said first bore means.

46. An arrangement according to claim 45, wherein a wall member is provided in said housing means of said pressure reducing means for separting said pressure space means from said fluid inlet chamber means, said wall member having a first surface portion defining a terminating wall of said first bore means and a second surface portion defining a terminating wall of said fluid inlet chamber means, said second bore means being provided in said wall member and extending from said first surface portion thereof to said second surface portion thereof, and wherein said fluid inlet chamber means is an annular chamber surrounding said rod member between said valve cone means and the second surface portion of said wall member defining the terminating wall of said annular chamber.

47. An arrangement according to claim 46, wherein the cross sectional dimension of said second bore and said valve seat means are substantially identical.

48. An arrangement according to claim 47, wherein said means for communicating said fluid inlet chamber means with said pressure space means includes a fluid passage means extending through said valve cone means, said rod member and said piston means, and wherein fluid from said annular chamber flows through said passage means when said valve cone means is displaced from said valve seat means.

49. An arrangement according to claim 48, further comprising an alarm means arranged in said supply block means for providing a signal indicative of a drop of the inlet pressure of the compressed fluid below a predetermined minimum.

50. An arrangement according to claim 42, wherein said pressure responsive element in a diaphragm means, said housing means of said pressure reducing means including a first bore means for receiving said diaphragm means, said diaphragm means dividing said bore means into a first and second pressure space, said first pressure space constituting said pressure space means and said second pressure space accommodating said biasing means.

51. An arrangement according to claim 50, wherein said biasing means is a spring, one end of said spring abutting a surface portion of said diaphragm means, the other end of said spring engaging a portion of said housing means, said control means including a valve seat means disposed in said fluid inlet chamber means and a valve cone means mounted on said connecting means cooperating with said valve seat means.

52. An arrangement according to claim 51, wherein said connecting means includes a rod member secured at one end thereof to said diaphragm means and having provided on the other end thereof a valve cone means, a second bore means provided in said housing means between said first bore means and said fluid inlet chamber means for receiving and guiding said rod member, and means for fluid-tightly sealing said second bore means to prevent the flow of fluid from said fluid inlet chamber means through said second bore means into said first bore means.

53. An arrangement according to claim 52, further comprising an alarm means arranged in said supply block means for providing a signal indicative of a drop of the inlet pressure of the compressed fluid below a predetermined minimum.

* * * * *